US009888805B2

(12) United States Patent
De Mango

(10) Patent No.: US 9,888,805 B2
(45) Date of Patent: Feb. 13, 2018

(54) BREWING ASSEMBLY FOR A MACHINE FOR THE PREPARATION OF BEVERAGES USING CAPSULES

(71) Applicant: LUIGI LAVAZZA S.P.A., Turin (IT)

(72) Inventor: Carlo De Mango, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 0 days.

(21) Appl. No.: 14/417,884

(22) PCT Filed: Jul. 29, 2013

(86) PCT No.: PCT/IB2013/056214
§ 371 (c)(1),
(2) Date: Jan. 28, 2015

(87) PCT Pub. No.: WO2014/020519
PCT Pub. Date: Feb. 6, 2014

(65) Prior Publication Data
US 2015/0173560 A1    Jun. 25, 2015

(30) Foreign Application Priority Data

Jul. 30, 2012 (IT) .............................. TO2012A0672

(51) Int. Cl.
*A47J 31/40* (2006.01)
*A47J 31/36* (2006.01)

(52) U.S. Cl.
CPC ......... *A47J 31/407* (2013.01); *A47J 31/3633* (2013.01); *A47J 31/3638* (2013.01)

(58) Field of Classification Search
CPC ...... A47J 31/407; A47J 31/18; A47J 31/4403; A47J 31/0636; A47J 31/20; A47J 31/02;
(Continued)

(56) References Cited

U.S. PATENT DOCUMENTS 2,968,560 A * 1/1961 Goros .................... A23F 5/267
                                                  426/115
3,295,998 A * 1/1967 Goros ................. A47J 31/3633
                                                  221/124
(Continued)

FOREIGN PATENT DOCUMENTS

EP        1 886 942 B1    11/2009
WO    2010/149468 A1    12/2010
(Continued)

OTHER PUBLICATIONS

International Search Report for PCT/IB2013/056214 dated Jan. 23, 2014.

*Primary Examiner* — Eric Stapleton
(74) *Attorney, Agent, or Firm* — Sughrue Mion, PLLC

(57) ABSTRACT

The brewing assembly (1) comprises a support structure (2) which is operationally stationary and in which the following are mounted:
a movable part (4) including a cup-shaped body (5) in which there is defined a receptacle (6) suitable for receiving a capsule (C) or the like containing a substance for the preparation of a beverage;
a cooperating locating part (9) provided with a member (10) for performing perforation and/or injecting water and/or steam; and
a displacement mechanism (11) for causing displacement of the movable part (4) between an open position, remote from the locating part (9), in which the cup-shaped body (5) is in a position suitable for receiving a capsule (C) or the like, and a closed position, in which the cup-shaped body (5) is able to be coupled with the locating part (9) so as to define therewith a brewing chamber in which the capsule (C) is sealingly clamped, for preparation of the beverage.

(Continued)

When passing from the closed position to the open position the movable part (4) performs an initial movement away from the locating part (9) and a subsequent movement during which it substantially pivots about an at least approximately horizontal transverse axis.

A disengagement member (30) protruding axially beyond the cup-shaped body (5) towards the locating part (9) is fixed to the movable part (4) and is configured and arranged such that during the subsequent pivoting movement of the movable part (4) its path is able to interfere with a used capsule (C) which may be still attached to the locating part (9) so as to cause it to be detached therefrom.

3 Claims, 8 Drawing Sheets

(58) Field of Classification Search
CPC .... A47J 31/0689; A47J 31/0642; A47J 31/44; A47J 31/40; A47J 31/068
USPC ....... 99/279, 284, 290, 295, 302 P, 304–309, 99/316–323; 426/77–83
See application file for complete search history.

(56) References Cited

U.S. PATENT DOCUMENTS

| | | | | |
|---|---|---|---|---|
| 3,403,617 A * | 10/1968 | Lampe | ............. | A47J 31/005 222/86 |
| 3,470,812 A * | 10/1969 | Levinson | ............. | A47J 31/005 99/295 |
| 3,824,913 A * | 7/1974 | Herman | ............. | A47J 31/60 99/298 |
| 5,649,472 A * | 7/1997 | Fond | ............. | A47J 31/0673 426/433 |
| 5,794,519 A * | 8/1998 | Fischer | ............. | A47J 31/0678 99/295 |
| 6,026,732 A * | 2/2000 | Kollep | ............. | A47J 31/0668 99/295 |
| 7,444,927 B1 * | 11/2008 | Crosville | ............. | A47J 31/3676 99/295 |
| 7,980,169 B2 * | 7/2011 | Fischer | ............. | A47J 31/3685 99/279 |
| 8,074,560 B2 * | 12/2011 | Levi | ............. | A47J 31/3633 99/289 R |
| 8,079,300 B2 * | 12/2011 | Jing | ............. | A47J 31/3638 99/289 R |
| 8,316,759 B2 * | 11/2012 | Ozanne | ............. | A47J 31/3628 426/590 |
| 8,567,304 B2 * | 10/2013 | Saxton | ............. | A47J 31/46 426/433 |
| 8,839,710 B2 * | 9/2014 | Accursi | ............. | A47J 31/0673 99/289 R |
| 2002/0167574 A1 * | 11/2002 | Shinada | ............. | D06M 13/44 347/86 |
| 2005/0160919 A1 * | 7/2005 | Balkau | ............. | A47J 31/0673 99/279 |
| 2009/0308258 A1 * | 12/2009 | Boussemart | ............. | A47J 31/3633 99/295 |
| 2010/0101428 A1 * | 4/2010 | Fin | ............. | A47J 31/3638 99/295 |
| 2010/0107889 A1 * | 5/2010 | Denisart | ............. | A47J 31/3695 99/295 |
| 2010/0206177 A1 * | 8/2010 | Ricotti | ............. | A47J 31/0673 99/295 |
| 2012/0031281 A1 * | 2/2012 | Denisart | ............. | A47J 31/3676 99/295 |

FOREIGN PATENT DOCUMENTS

WO 2011/015978 A2 2/2011
WO 2011/151787 A1 12/2011

* cited by examiner

BREWING ASSEMBLY FOR A MACHINE FOR THE PREPARATION OF BEVERAGES USING CAPSULES

BACKGROUND OF THE INVENTION

Field of the Invention

The present invention relates to a brewing assembly for a machine for the preparation of beverages, in particular coffee, using capsules and the like.

Background

More specifically the invention relates to a brewing assembly of the type comprising a support structure which is operationally stationary and in which the following are mounted:
- a movable part including a cup-shaped body in which there is defined a receptacle suitable for receiving a capsule or the like containing a substance for the preparation of a beverage;
- a cooperating locating part, provided with means for performing perforation and injecting water and/or steam; and
- a displacement mechanism for causing displacement of the movable part between an open position, remote from the locating part, in which said cup-shaped body is in a position suitable for receiving a capsule or the like, and a closed position in which said cup-shaped body is able to be coupled with the cooperating locating part so as to define therewith a brewing chamber in which said capsule is sealingly clamped for preparation of the beverage;
- the arrangement being such that when passing from the closed position to the open position the aforementioned movable part performs an initial movement away from the cooperating locating part and a subsequent movement during which it substantially pivots about an at least approximately horizontal transverse axis.

In a brewing assembly of this type, after preparation of a beverage, the used capsule is generally removed, falling by means of gravity, when the movable part passes from the closed position into the open position. The problem may however arise on occasions that, when the movable part moves away from the closed position into the open position, the used capsule remains attached to the locating part and does not fall by means of gravity. This may be due to the fact that the locating part comprises at least one perforating member which tears and penetrates inside the capsule and, after dispensing of the beverage, the used capsule is retained by this perforating member and/or remains attached to the locating part of the brewing assembly, also as a result of a certain "gluing" action of the residues of the beverage produced.

An object of the present invention is to provide a brewing assembly of the type defined above which is able to overcome the abovementioned drawback of the assemblies according to the prior art.

This object, together with other objects, is achieved according to the invention by a brewing assembly of the type initially defined, characterized in that a disengagement member protruding axially beyond the aforementioned cup-shaped body towards the cooperating locating part is fixed to the movable part of said assembly, said disengagement member being configured and arranged such that during the aforementioned subsequent movement of the movable part the path of said member is able to interfere with the used capsule which may be still attached to the locating part so as to cause it to be detached therefrom.

BRIEF DESCRIPTION OF THE DRAWINGS

Further characteristic features and advantages of the invention will become clear from the following detailed description provided purely by way of a non-limiting example, with reference to the accompanying drawings in which.

DETAILED DESCRIPTION OF THE INVENTION

Figure 1:
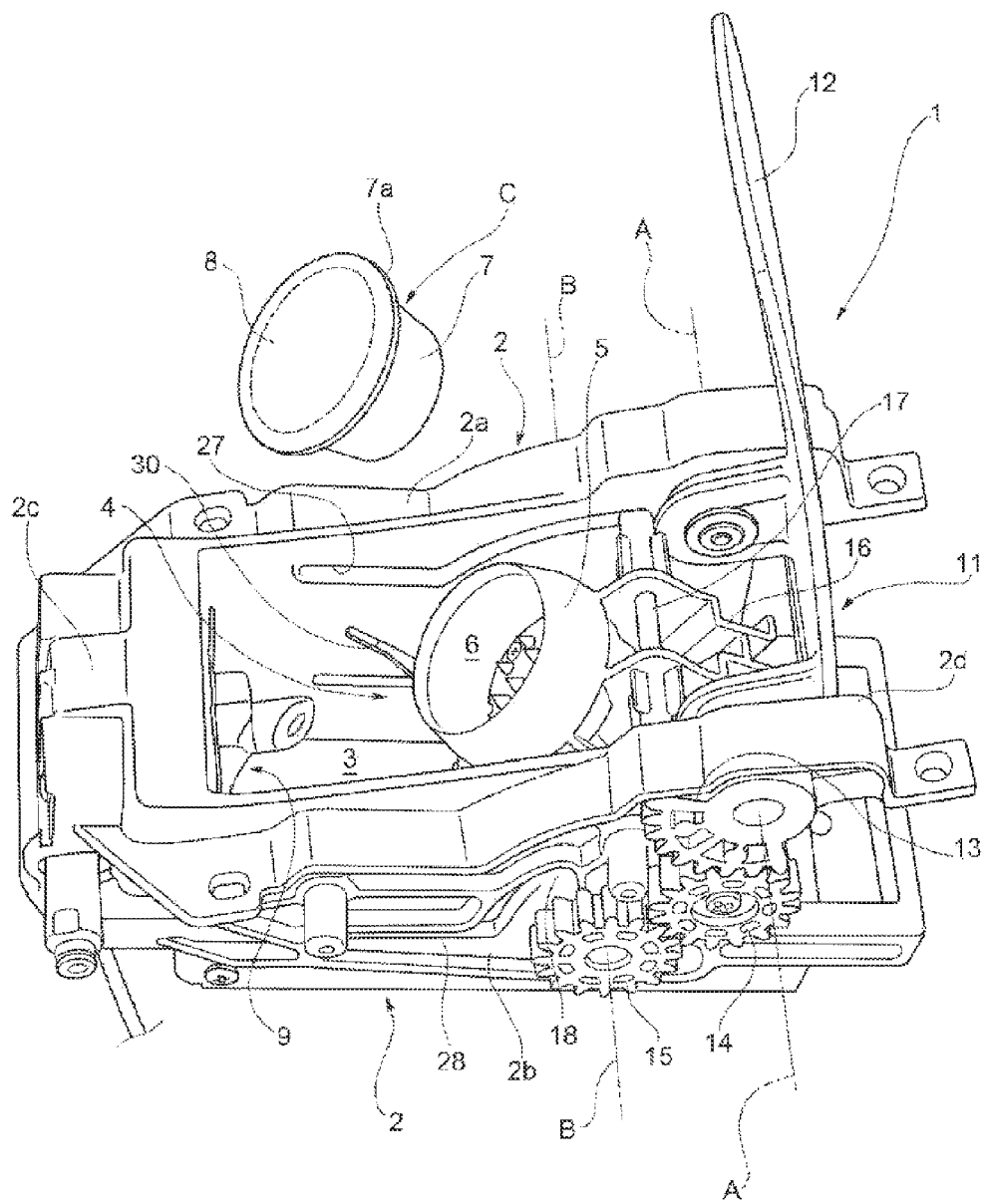
FIG. 1 is a perspective view of a brewing assembly according to the invention, shown with the movable part in the open position.

In the drawings 1 denotes in its entirety a brewing assembly for a machine for the preparation of beverages (not shown) using capsules or the like.

The brewing assembly 1 comprises a support structure 2 which is operationally stationary and made, for example of moulded plastic.

In the embodiment shown by way of example the support structure 2 comprises two side walls 2a, 2b which are facing and parallel and interconnected by two end portions 2c and 2d.

A working region, denoted by 3, is defined inside the support structure 2, and in particular between the side walls or shoulders 2a and 2b. A movable part—denoted overall by 4—including an essentially cup-shaped body 5 is mounted in this region.

In this body 5 there is defined a receptacle 6 suitable for receiving a capsule C or the like, of the type known per se, containing a substance for the preparation of a beverage.

The capsule C is for example of the type described and illustrated in European patent 1,886,942 B1 in the name of the same Applicant and comprises a moulded-plastic body 7 essentially shaped in the manner of a cup and having an end flange 7a which protrudes radially outwards and on which a sealing cap 8 is sealingly fitted (see in particular FIG. 1).

The stationary support structure 2 also has, mounted therein, a locating part 9 intended to cooperate with the movable part 4, as will be described in greater detail below.

Figure 7:
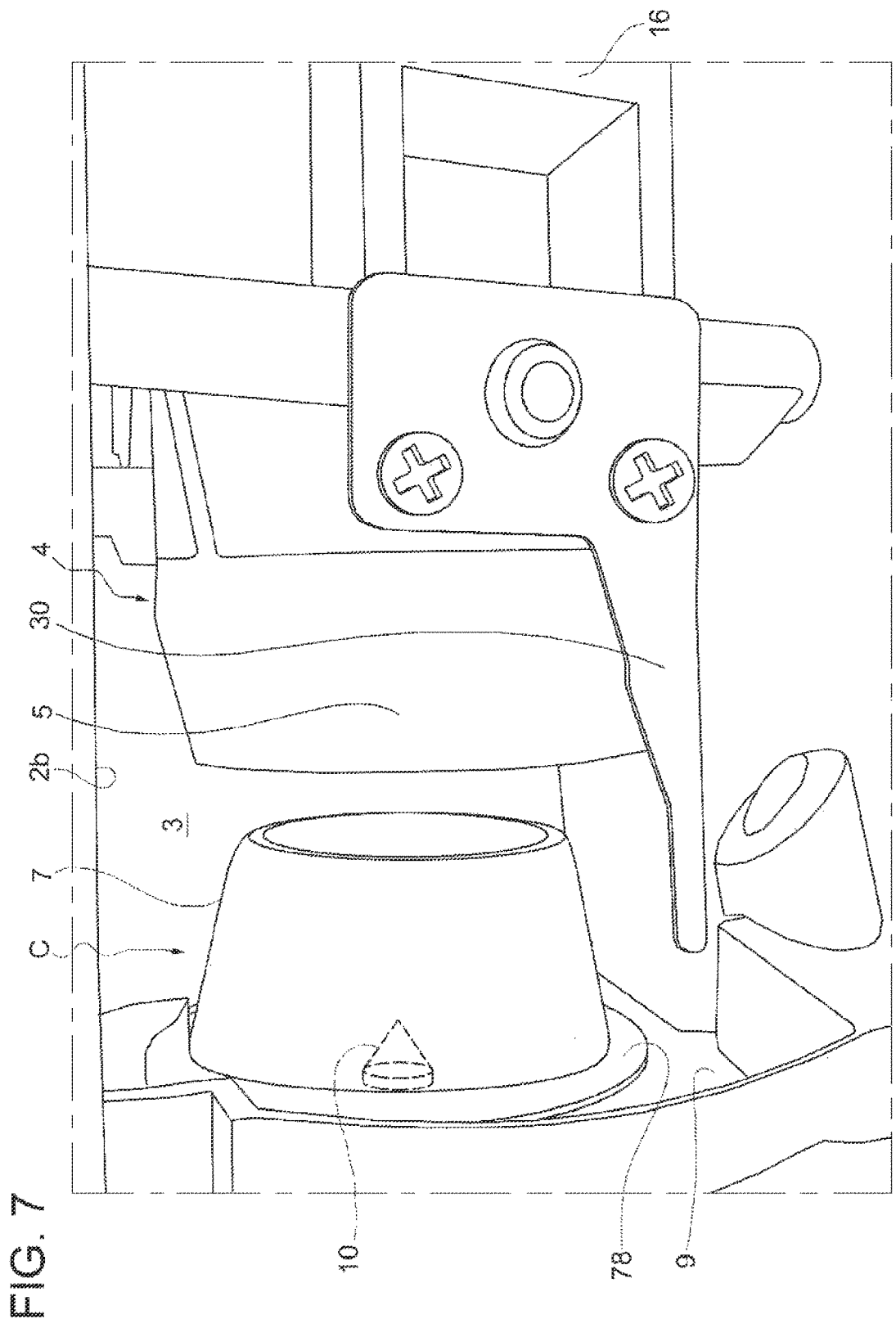
FIG. 7 is a partial perspective view, from below, of the brewing assembly according to the preceding figures, shown in a condition in which a used capsule remains attached to the cooperating locating part.

In a manner known per se, the locating part 9 is provided with means for performing perforation and injecting water and/or steam, shown in broken lines in FIG. 7 where it is denoted by 10.

Figure 5:
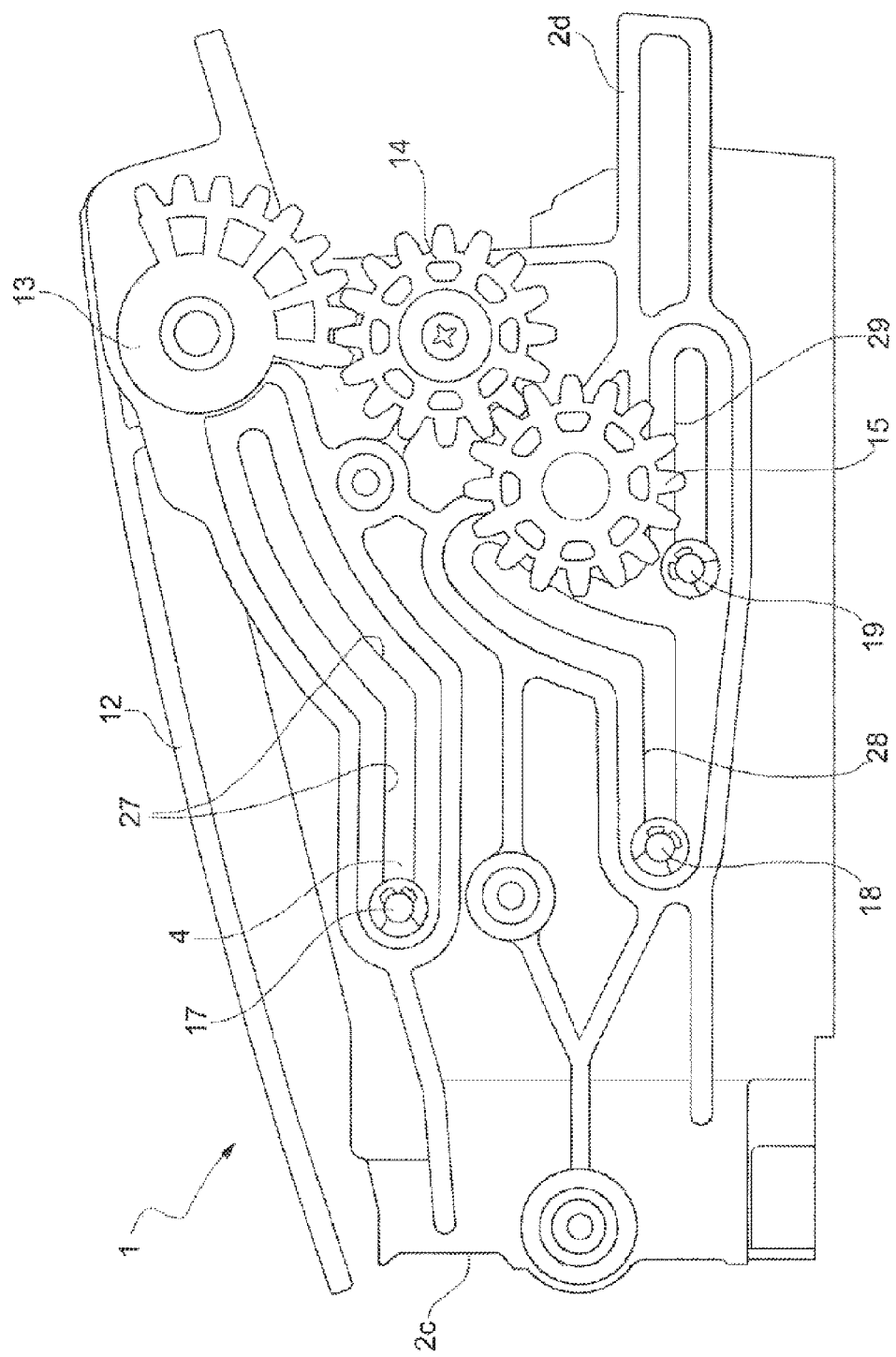
FIG. 5 is a side view of the brewing assembly according to the above figures, shown in the condition where its movable part is in the closed position.
Figure 6:
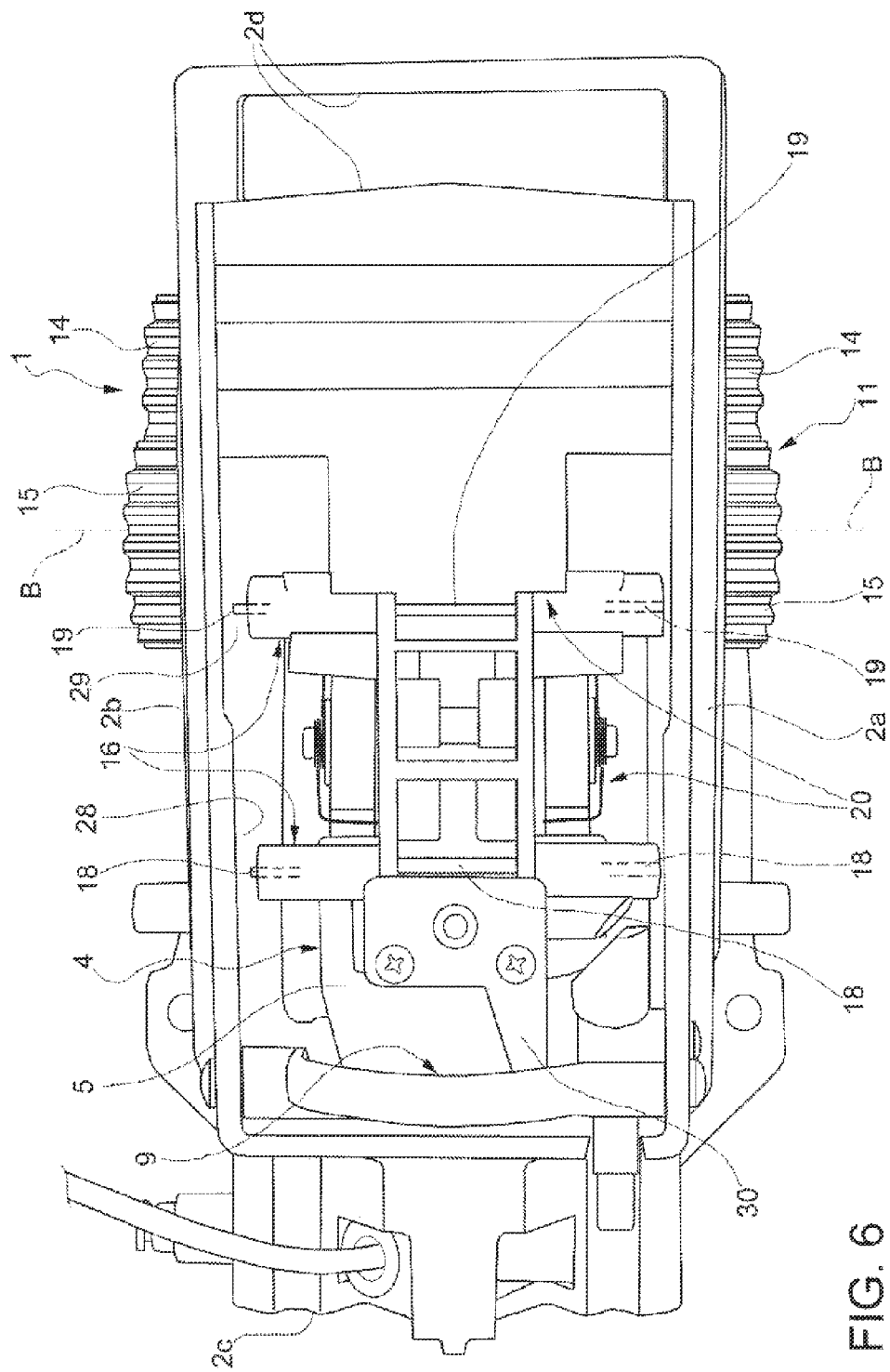
FIG. 6 is a plan view, from below, of the brewing assembly in the condition shown in FIG. 5.

The brewing assembly 1 also comprises a displacement mechanism, denoted overall by 11, for causing displacement of the movable part 4 between the open position (shown in FIG. 1) in which the cup-shaped body 5 is in a position suitable for allowing the arrangement of a capsule C inside its receptacle 6, and a closed position—shown in FIGS. 5 and 6—in which this cup-shaped body 5 is coupled with the locating part 9 so as to define therewith a brewing chamber in which the capsule C is clamped, for preparation of the beverage.

The mechanism 11 in the embodiment shown comprises a lever 12 which can be manually operated and is mounted rotatably between the side walls 2a and 2b of the support structure 2 about a fixed axis A-A indicated by A-A in FIG. 1.

Two toothed segments 13 (only one of which is visible in FIGS. 1 to 5) are mounted on the outside of the side walls 2a and 2b of the support structure 2, being rotatable about the axis A-A and integrally connected to the operating levers 12.

The toothed segments 13 mesh with corresponding intermediate idle gear wheels 14 which in turn mesh with corresponding end gear wheels 15 which are rotatable about a common horizontal axis B-B parallel to the axis A-A.

The cup-shaped body 5 of the movable part 4 is integral with a structure 16 which supports an upper transverse pin 17 and a pair of lower transverse pins 18 and 19, which are all parallel to each other (see for example FIGS. 1, 5 and 6).

The opposite ends of the pins 17, 18 and 19 engage inside respective shaped guiding grooves—denoted by 27, 28 and 29—which are provided in the side walls 2a and 2b of the support structure 2 (see for example FIGS. 5 and 6).

The end gear wheels 15 are connected to the structure 16 of the movable part 4 by means of a transmission mechanism denoted overall by 20 in FIG. 6. This mechanism is for example of the type described and illustrated in patent application WO 2011/015978 in the name of the same Applicant.

The arrangement is such that, by operating the lever 12, it is possible to cause displacement of the movable part 4 between the open position shown in FIG. 1 and the closed position shown in FIGS. 5 and 6.

Figure 3:
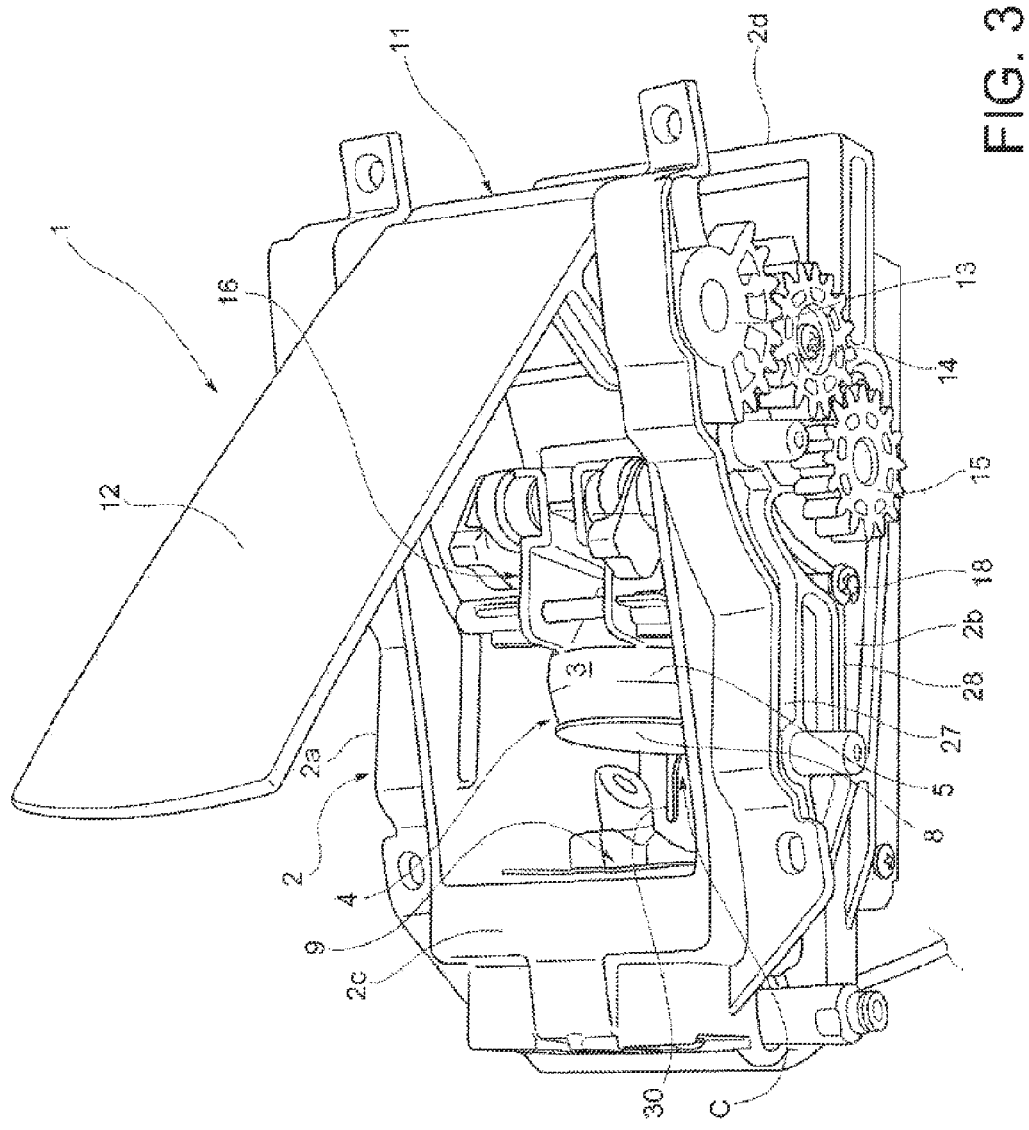
Figure 4:
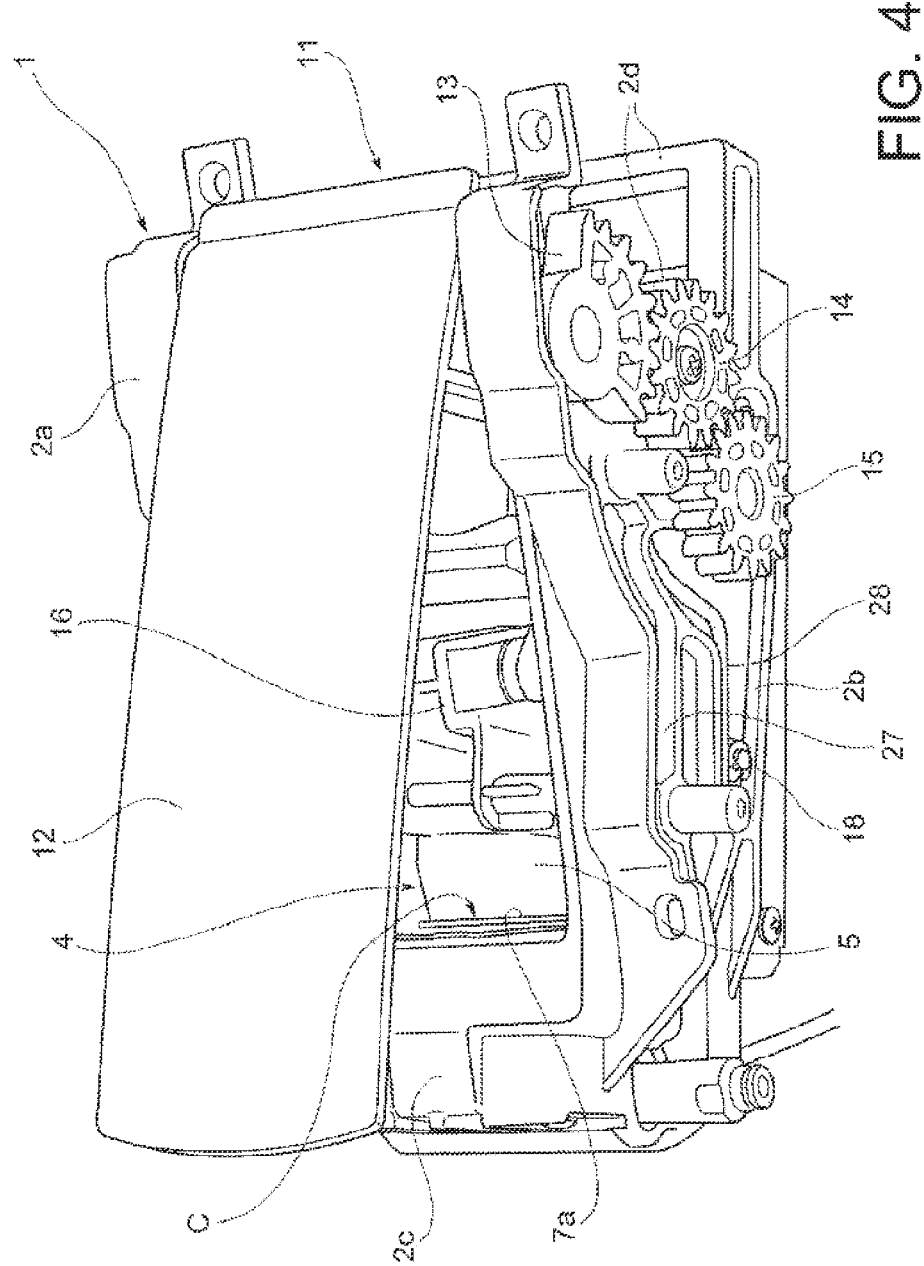

It can be seen in particular that, when passing from the open position to the closed position, the structure 16 and the cup-shaped body 5 of the movable part 4 perform firstly a pivoting movement, about a transverse axis which is at least approximately horizontal (see the sequence shown in FIGS. 1 to 3) and then a final approach movement, substantially a translatory movement, towards the locating part 9 (FIGS. 4 to 6).

Figure 2:
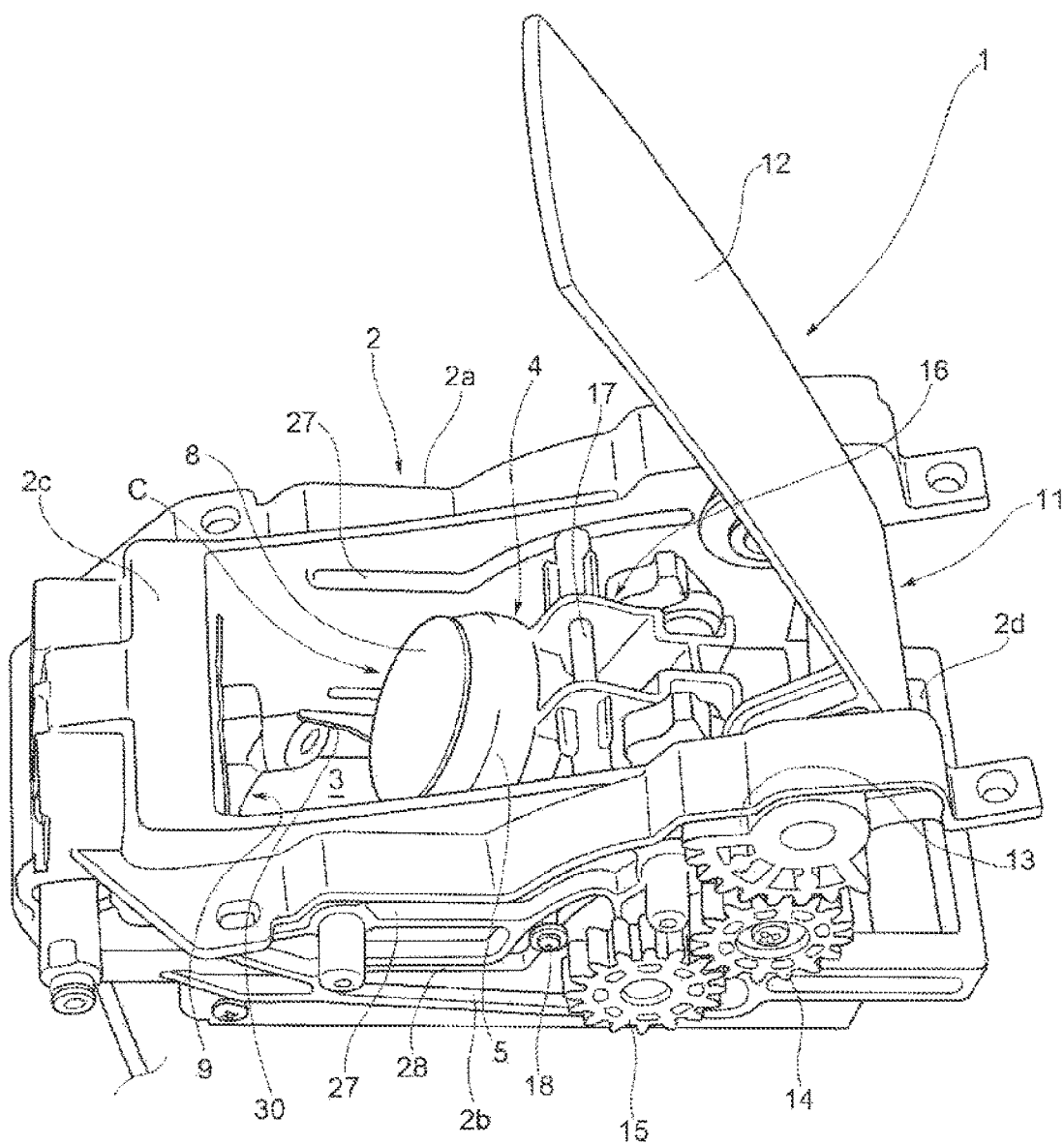
FIGS. 2, 3 and 4 are perspective views similar to that shown in FIG. 1 and show the brewing assembly with the movable part in successive intermediate positions between the open position and the closed position.

The reverse movement, namely from the closed position to the open position, correspondingly comprises an initial movement of the movable part 4 away from the locating part 9, essentially of a translatory nature, and then a subsequent movement during which it substantially pivots about an at least approximately horizontal, transverse axis in accordance with the sequence shown in FIGS. 3, 2 and then 1.

Figure 8:
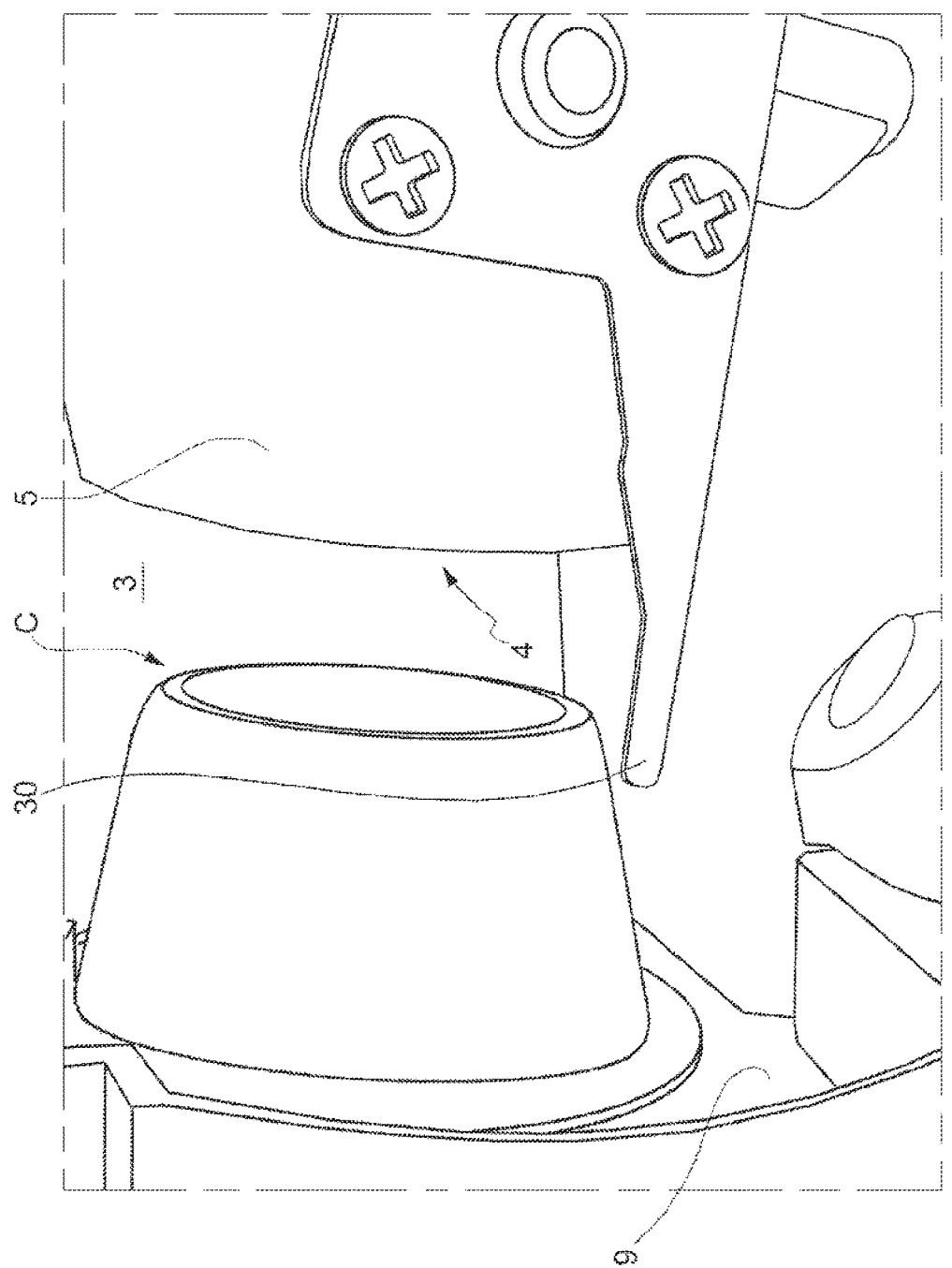
FIG. 8 is a perspective view, similar to that of FIG. 7, and shows how a disengagement member mounted on the movable part is able to interfere with the used capsule still attached to the locating part, so as to cause detachment thereof, during the return movement into the open condition.

As can be seen in the drawings, and in particular in FIGS. 6 to 8, a disengagement member 30 protruding axially beyond the cup-shaped body 5 towards the locating part 9 is fixed to the movable part 4 of the brewing assembly.

The disengagement member 30 is for example made of metallic material and may be fixed to the movable part 4 by means of screws, as can be seen for example in FIG. 6.

This disengagement member 30 is configured and arranged such that, during the displacement towards the open condition of the assembly, when the movable part 4 performs the aforementioned pivoting movement, the path of said member 30 is able to interfere with the used capsule C which may be still attached to the locating part 9, so as to cause it to be detached therefrom.

FIG. 7 shows a used capsule C which has remained attached to the locating part 9, while the movable part 4 moves away from it, with an essentially translatory movement.

FIG. 8 shows the movable part 4 of the brewing assembly during the initial stage of the pivoting movement into the open position: this pivoting movement causes a corresponding pivoting movement of the disengagement member 30 which with its remote end interferes with the body of the used capsule C which has remained attached to the locating part 9, so as to cause it to be positively detached therefrom.

Once detached, the used capsule C may fall by means of gravity towards a collection and/or evacuation zone.

The solution described above according to the present invention may be implemented in an extremely simple and low-cost manner and its operation is extremely reliable.

Obviously, without affecting the principle of the invention, the embodiments and the constructional details may be significantly modified with respect to that described and illustrated purely by way of a non-limiting example, without thereby departing from the scope of the invention as defined in the accompanying claims.

The invention claimed is:
1. A brewing assembly (1) for the preparation of beverages, comprising a support structure (2) which is operationally stationary and in which the following are mounted:
   a movable part (4) including a cup-shaped body (5) in which there is defined a receptacle (6) suitable for receiving a capsule (C) containing a substance for the preparation of a beverage;
   a cooperating counter-part (9) configured to cooperate with the movable part (4) and provided with at least one perforating member (10) for perforating the capsule (C) and injecting water and/or steam into the capsule (C); and
   a displacement mechanism (11) for causing displacement of the movable part (4) relative to the counter-part (9) between an open position, remote from the counter-part (9), in which said cup-shaped body (5) is in a position suitable for receiving the capsule (C), and a closed position, in which said cup-shaped body (5) is coupled with the counter-part (9) so as to define therewith a brewing chamber in which said capsule (C) is sealingly clamped, for preparation of the beverage;
   wherein when passing from the closed position to the open position said movable part (4) performs an initial substantially translational movement away from the counter-part (9) and a subsequent movement during which it substantially pivots about an at least approximately horizontal transverse axis;
   the brewing assembly (1) further comprising a disengagement member (30) protruding axially from the movable part (4) beyond said cup-shaped body (5) towards the counter-part (9), and fixed to the movable part (4) so as to move rigidly with the movable part (4) between said closed and open positions, said disengagement member (30) being configured and arranged so as to interfere, during pivoting movement thereof corresponding to said subsequent pivoting movement of the movable part (4), with a used capsule (C) which may be still attached to the counter-part (9) so as to cause said used capsule (C) to be detached from the counter-part (9).

2. The brewing assembly according to claim 1, wherein the disengagement member (30) is fixed to the bottom of the movable part (4).

3. The brewing assembly according to claim 2, wherein the disengagement member (30) is fixed underneath the cup-shaped body (5).

\* \* \* \* \*